(12) United States Patent
Plestid (10) Patent No.: US 8,301,179 B2
(45) Date of Patent: Oct. 30, 2012

(54) METHOD AND SYSTEM FOR COMMUNICATING A MESSAGE ATTACHMENT

(75) Inventor: Thomas Leonard Plestid, Ottawa (CA)

(73) Assignee: Research In Motion Limited, Waterloo (CA)

( * ) Notice: Subject to any disclaimer, the term of this patent is extended or adjusted under 35 U.S.C. 154(b) by 442 days.

(21) Appl. No.: 11/634,571

(22) Filed: Dec. 6, 2006

(65) Prior Publication Data
US 2008/0139199 A1    Jun. 12, 2008

(51) Int. Cl.
*H04W 4/00* (2009.01)
*H04M 1/725* (2006.01)
*H04M 3/42* (2006.01)
*G06F 15/16* (2006.01)

(52) U.S. Cl. ............ 455/466; 455/412.1; 455/412.2; 455/414.1; 709/200; 709/206; 709/207

(58) Field of Classification Search .......... 455/466, 455/426, 412.1, 412.2, 426.1, 414.1; 709/207, 709/200, 206; 370/350
See application file for complete search history.

(56) References Cited

U.S. PATENT DOCUMENTS

| | | | |
|---|---|---|---|
| 7,275,116 B1 * | 9/2007 | Hanmann et al. | 709/250 |
| 2001/0005857 A1 * | 6/2001 | Lazaridis et al. | 709/219 |
| 2002/0016818 A1 * | 2/2002 | Kirani et al. | 709/203 |
| 2002/0120874 A1 * | 8/2002 | Shu et al. | 713/201 |
| 2004/0054650 A1 * | 3/2004 | Chun | 707/1 |
| 2004/0057408 A1 * | 3/2004 | Gray | 370/338 |
| 2004/0140989 A1 * | 7/2004 | Papageorge | 345/700 |
| 2004/0203873 A1 * | 10/2004 | Gray | 455/456.1 |
| 2004/0205248 A1 * | 10/2004 | Little et al. | 709/246 |
| 2005/0076087 A1 * | 4/2005 | Budd et al. | 709/206 |
| 2005/0100313 A1 * | 5/2005 | Wang | 386/46 |
| 2005/0108335 A1 * | 5/2005 | Naick et al. | 709/206 |
| 2005/0193069 A1 * | 9/2005 | Brown et al. | 709/206 |
| 2005/0226178 A1 * | 10/2005 | Forand et al. | 370/328 |
| 2007/0016636 A1 * | 1/2007 | Boerries et al. | 709/200 |

FOREIGN PATENT DOCUMENTS

| | | |
|---|---|---|
| WO | WO 99/14909 | 3/1999 |
| WO | WO 00/10357 * | 2/2000 |
| WO | WO 02/091200 A1 | 11/2002 |
| WO | WO 2005/083586 A2 | 9/2005 |

OTHER PUBLICATIONS

European Search Report; European Patent Office; May 7, 2007; 6 pages.
Canadian Office Action for Application No. 2,613,759; Canadian Intellectual Property Office; May 13, 2009; 2 Pages.
Canadian Office Action, Application No. 2,613,759; Canadian Intellectual Property Office; Jan. 31, 2011; 2 Pages.

* cited by examiner

*Primary Examiner* — Marisol Figueroa
*Assistant Examiner* — Dung Hong
(74) *Attorney, Agent, or Firm* — The Danamraj Law Group, P.C.

(57) ABSTRACT

A method and system for transmitting electronic messages. The system includes a messaging application executing on a computer. The messaging application is operable to receive from a message sender an electronic message having an attachment associated therewith, operable to communicate the electronic message to the mobile communication device via a first wireless data path and operable to communicate the attachment associated with the electronic message to the mobile communication device via a second wireless data path having a higher bandwidth than the first wireless data path.

16 Claims, 7 Drawing Sheets

METHOD AND SYSTEM FOR COMMUNICATING A MESSAGE ATTACHMENT

TECHNICAL FIELD OF THE APPLICATION

The present disclosure generally relates to wireless packet data service networks. More particularly, and not by way of any limitation, the present disclosure is directed to a mobile communications device and related data service network employing a method and system for forwarding a message attachment to a mobile communication device using an alternate or high-bandwidth communications channel.

BACKGROUND

The present disclosure is directed toward the management of attachments to electronic messages, which may include, for example, documents, other electronic messages, computer programs, spreadsheets, digital images, audio files or video files. Message attachments often have a significantly greater size as compared to text messages with which they are associated. When an electronic message associated with an attachment is presented to the recipient, an icon or other indication is generally presented to the recipient in order to notify the recipient that the message has an attachment associated therewith. The recipient may then open the attachment at the recipient's convenience.

BRIEF DESCRIPTION OF THE DRAWINGS

A more complete understanding of the embodiments of the present disclosure may be had by reference to the following Detailed Description when taken in conjunction with the accompanying drawings wherein.

DETAILED DESCRIPTION OF THE DRAWINGS

A system and method of the present disclosure will now be described with reference to various examples of how the embodiments can best be made and used. Identical reference numerals are used throughout the description and several views of the drawings to indicate identical or corresponding parts, wherein the various elements are not necessarily drawn to scale.

According to a first aspect, the present disclosure relates to a method of transmitting electronic messages from a computer to a mobile communication device. The method comprises the steps of receiving an electronic message having an attachment associated therewith; transmitting the electronic message to the mobile communication device via a first wireless data path between the computer and the mobile communication device; and transmitting the attachment to the mobile communication device via a second wireless data path between the computer and the mobile communication device, the second wireless data path having a higher bandwidth than the first wireless data path. The second wireless path may employ an alternate radio access technology (RAT) (such as Bluetooth, Wi-fi, etc.) or may employ the same RAT but at a higher QoS granting higher packet data bandwidth. The second wireless path may also employ means for establishing the best type of second data path.

In certain embodiments, the computer and the mobile communication device communicate via the first wireless data path in order to establish the second wireless data path. At least one of the first and second wireless data paths may be a secure data path. In certain embodiments, the first data path passes through a message relay and the second data path circumvents the message relay. The first wireless data path may pass through a first wireless gateway while the second data path passes through a second wireless gateway. The second wireless data path may be a virtual private network. The method may further include the step of terminating the second wireless data path upon completion of the transmission of the attachment.

According to a second aspect, the present disclosure relates to a system for transmitting electronic messages from a computer to a mobile communication device. The system comprises a computer; and a messaging application executing on the computer. The messaging application is operable to receive from a message sender an electronic message having an attachment associated therewith, communicate the electronic message to the mobile communication device via a first wireless data path and communicate the attachment associated with the electronic message to the mobile communication device via a second wireless data path, the second wireless data path having a higher bandwidth than the first wireless data path.

According to a third aspect, the present disclosure relates to a method of receiving a message attachment at a mobile communication device. The method comprises receiving a notification of a message attachment via a first wireless path between the mobile communication device and a communication node; and receiving the message attachment via a second wireless data path between the mobile communication device and the communications node, the second wireless data path having a higher bandwidth than the first wireless data path.

Figure 1:
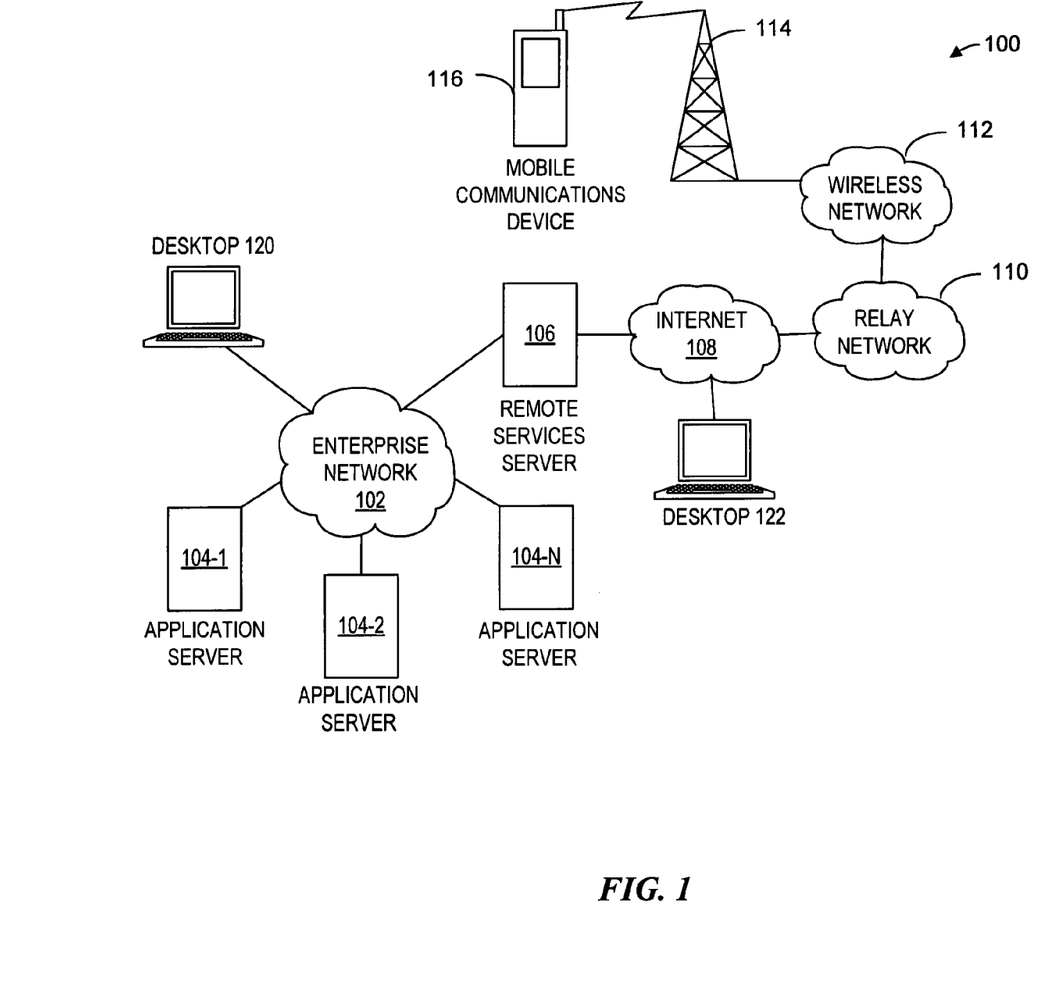
FIG. 1 depicts an exemplary network environment including a wireless packet data service network wherein an embodiment of the present disclosure may be practiced.

Referring now to the drawings, and more particularly to FIG. 1, depicted therein is an exemplary network environment 100 including a wireless packet data service network 112 wherein an embodiment of the present system may be practiced. An enterprise network 102, which may be a packet-switched network, can include one or more geographic sites and may be organized across many RATs as a local area network (LAN), wide area network (WAN) or metropolitan area network (MAN), et cetera, for serving a plurality of corporate users.

A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. A single desktop computer 120 is shown connected to enterprise network 102, but those of skill in the art will appreciate that a diverse array of devices, including but not limited to desktop computers, laptop computers, palmtop computers, et cetera, although not specifically shown in FIG. 1, may be operably networked to one or more of the application servers 104-*i*, i=1, 2, . . . , N, with respect to the services supported within enterprise network 102.

Additionally, a remote services server 106 may be interfaced with the enterprise network 102 for enabling a corporate user to access or effectuate any of the services from a remote location using a suitable mobile communications device 116. By way of example, mobile communications device 116 may be a data-enabled handheld device capable of receiving and sending messages, web browsing, interfacing with corporate application servers, et cetera. A secure communication link with end-to-end encryption may be established that is mediated through an external IP network, i.e., a public packet-switched network such as the Internet 108, as well as the wireless packet data service network 112 operable with mobile communications device 116 via suitable wireless network infrastructure that includes a base station (BS) 114.

A single desktop computer 122 is shown connected to internet 108 for purposes of illustration. Those of skill in the art will appreciate that millions of devices are in fact connected to the internet 108, as discussed above with respect to enterprise network 102. These include, but are not limited to, desktop computers, laptop computers, palmtop computers, cellular telephones, personal digital assistants and other mobile communications devices. In one embodiment, a trusted relay network 110 may be disposed between the Internet 108 and the infrastructure of wireless packet data service network 112 as a means to abstract the one (internet) to many (wireless network providers) connection needs of remote services server 106 and desktops 122.

For purposes of the present disclosure, the wireless packet data service network 112 may be implemented in any known or heretofore unknown mobile communications technologies and network protocols. For instance, the wireless packet data service network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, or any 3rd Generation (3G) network. By way of providing an exemplary embodiment, the teachings of the present disclosure will be illustrated with a GPRS-based carrier network, although those skilled in the art should readily recognize that the scope of the present disclosure is not limited thereby.

Figure 2:
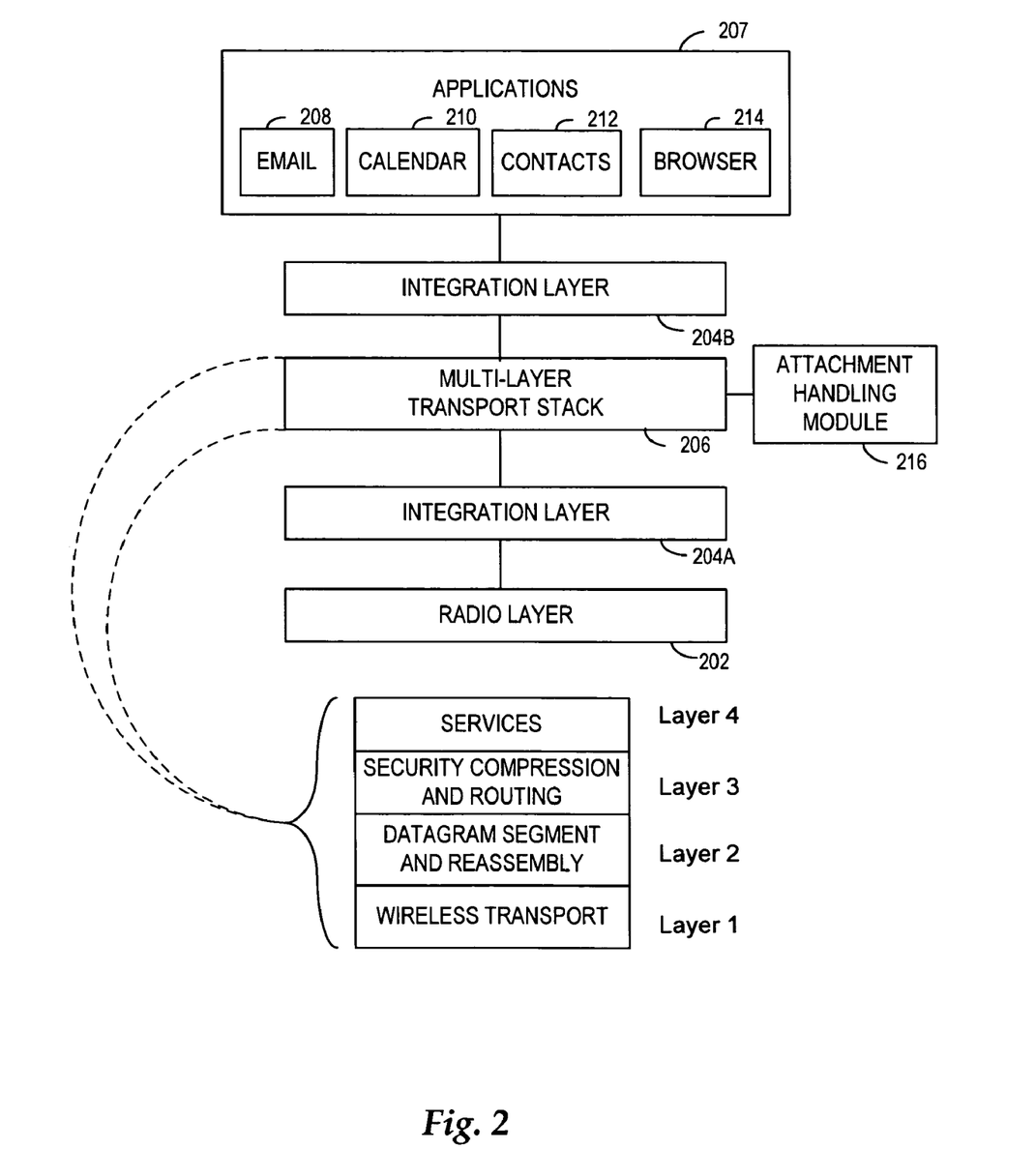
FIG. 2 depicts a software architectural view of a mobile communications device operable to facilitate messaging according to one embodiment.

FIG. 2 depicts a software architectural view of a mobile communications device according to one embodiment. A multi-layer transport stack (TS) 206 is operable to provide a generic data transport protocol for any type of corporate data, including email, via a reliable, secure and seamless continuous connection to a wireless packet data service network. As illustrated in this embodiment, an integration layer 204A is operable as an interface between the radio layer 202 and the transport stack 206 of mobile communications device 116. Likewise, another integration layer 204B is provided for interfacing between the transport stack 206 and the user applications 207 supported on the mobile communications device 116, e.g., email 208, calendar/scheduler 210, contact management 212 and browser 214. Although not specifically shown, the transport stack 206 may also be interfaced with the operating system of mobile communications device 116. In another implementation, the transport stack 206 may be provided as part of a data communications client module operable as a host-independent virtual machine on a mobile device. An attachment handling module 216 is operably connected to the transport stack in order to facilitate handling of attachments associated with electronic messages received at the mobile communication device 116.

The bottom layer (Layer 1) of the transport stack 206 is operable as an interface to the wireless network's packet layer. Layer 1 handles basic service coordination within the exemplary network environment 100 shown in FIG. 1. For example, when a mobile communications device roams from one carrier network to another, Layer 1 verifies that the packets are relayed to the appropriate wireless network and that any packets that are pending from the previous network are rerouted to the current network. The top layer (Layer 4) exposes various application interfaces to the services supported on the mobile communications device. The remaining two layers of the transport stack 206, Layer 2 and Layer 3, are responsible for datagram segmentation/reassembly and security, compression and routing, respectively. The radio layer 202 may be any number of a plurality of mobile communication technologies or RATs (which may include GPRS, EVDO, UMTS, HSDPA, Wi-fi, Bluetooth and WiMAX).

Figure 3:
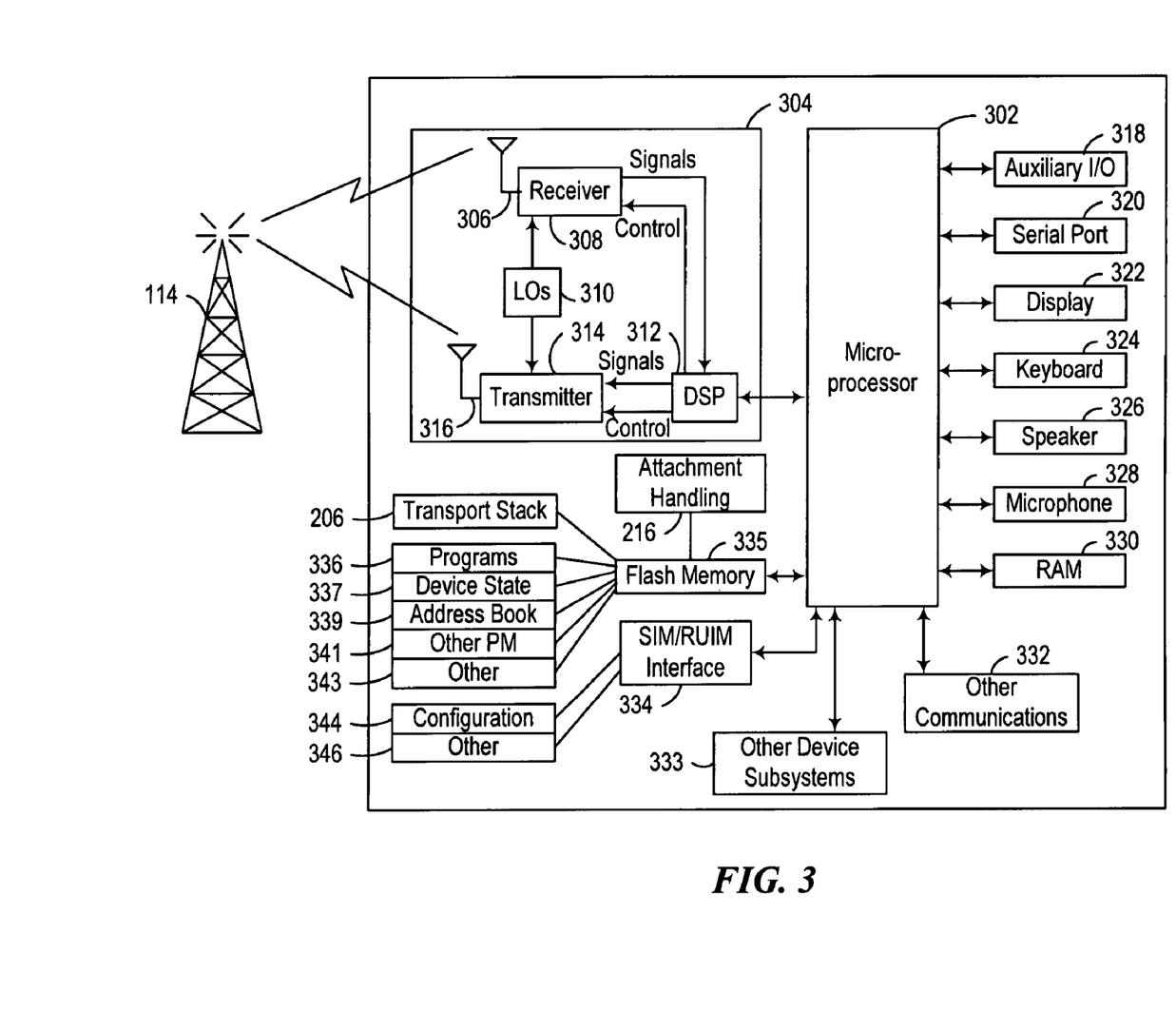
FIG. 3 depicts a block diagram of a mobile communications device operable to facilitate messaging according to one embodiment.

FIG. 3 depicts a block diagram of a mobile communications device according to one embodiment. It will be recognized by those skilled in the art upon reference hereto that although an embodiment of mobile communications device 116 may comprise an arrangement similar to one shown in FIG. 3, there can be a number of variations and modifications, in hardware, software or firmware, with respect to the various modules depicted. Accordingly, the arrangement of FIG. 3 should be taken as illustrative rather than limiting with respect to the embodiments of the present disclosure.

A microprocessor 302 providing for the overall control of an embodiment of mobile communications device 116 is operably coupled to a communication subsystem 304 which includes a receiver 308 and transmitter 314 as well as associated components such as one or more local oscillator (LO) modules 310 and a processing module such as a digital signal processor 312. As will be apparent to those skilled in the field of communications, the particular design of the communication module 304 may be dependent upon the communications network with which the mobile communications device 116 is intended to operate.

In one embodiment, the communication module 304 is operable with both voice and data communications. Regardless of the particular design, however, signals received by antenna 306 through base station 114 are provided to receiver 308, which may perform such common receiver functions as signal amplification, frequency down conversion, filtering, channel selection, analog-to-digital (A/D) conversion, and the like. Similarly, signals to be transmitted are processed, including modulation and encoding, for example, by digital signal processor 312, and provided to transmitter 314 for digital-to-analog (D/A) conversion, frequency up conversion, filtering, amplification and transmission over the air-radio interface via antenna 316.

Microprocessor 302 also interfaces with further device subsystems such as auxiliary input/output (I/O) 318, serial port 320, display 322, keyboard 324, speaker 326, microphone 328, random access memory (RAM) 330, a short-range communications subsystem 332, and any other device subsystems generally labeled as reference numeral 333. To control access, a Subscriber Identity Module (SIM) or Removable User Identity Module (RUIM) interface 334 is also provided in communication with the microprocessor 302. Access control methods may vary between different RATs (e.g., between Wi-fi and WiMAX).

In one implementation, SIM/RUIM interface 334 is operable with a SIM/RUIM card having a number of key configurations 344 and other information 346 such as identification and subscriber-related data. Operating system software and transport stack software may be embodied in a persistent storage module (i.e., non-volatile storage) such as Flash memory 335. In one implementation, flash memory 335 may be segregated into different areas, e.g., storage area for computer programs 336 as well as data storage regions such as device state 337, address book 339, other personal information manager (PIM) data 341, and other data storage areas generally labeled as reference numeral 343. Message handling module 216, including status update module 218, is operably connected to flash memory 335, including transport stack 206. As noted above and described in further detail below, attachment handling module 216 is operable to communicate with other devices as appropriate, generally via a wireless communication path.

Figure 4:
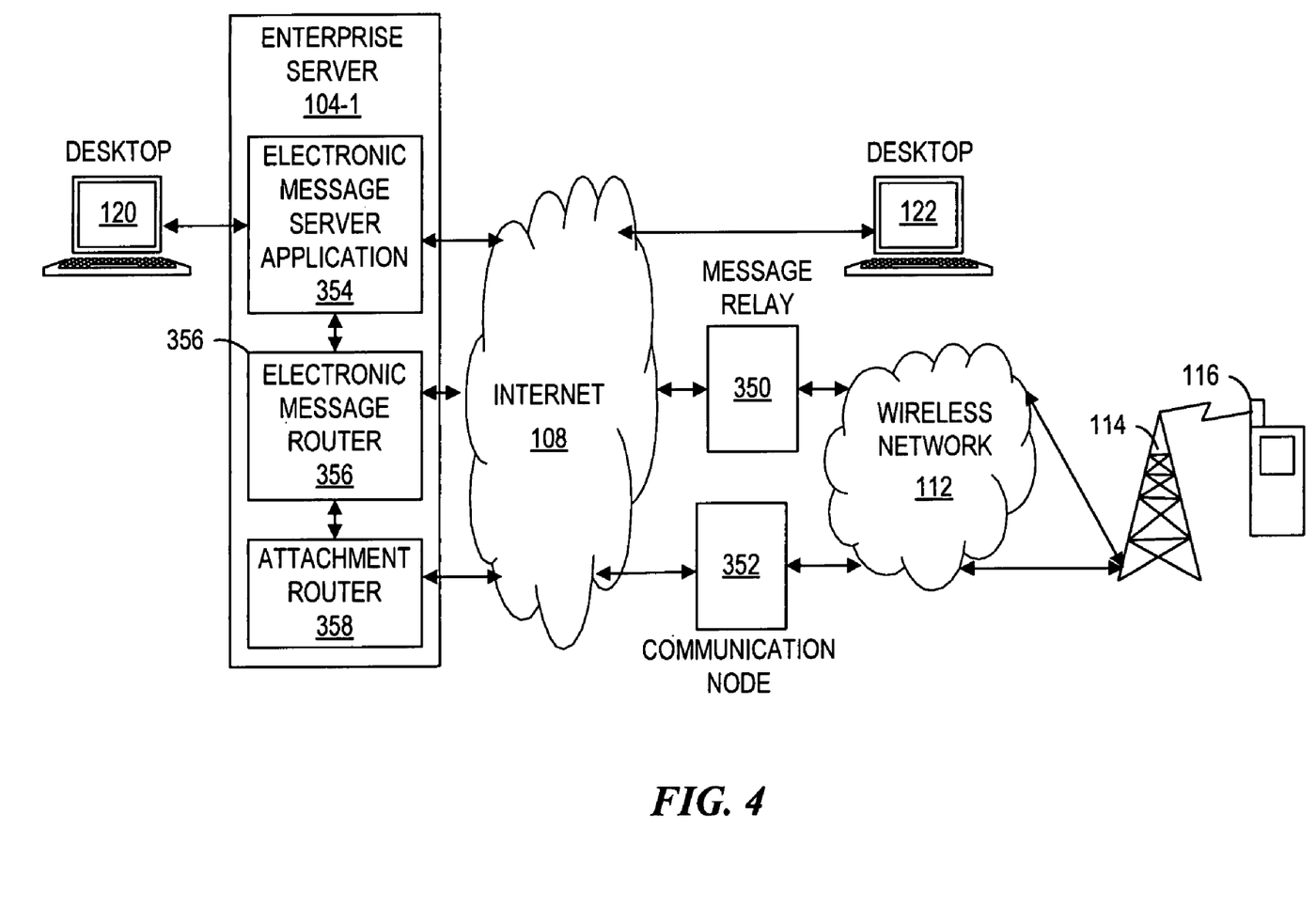
FIG. 4 depicts a detail view of the network environment of FIG. 1 showing the details of an enterprise server used for message forwarding.

FIG. 4 depicts a detail view of the network environment shown in FIG. 1. Certain components of relay network 110, including message relay 350 and communication node 352, are broken out specifically in this figure in order to more fully elaborate the relationships between these components and the networks within the network environment. Message relay 350 may represent any one of a number of network structures capable of operating as an interface between two networks. Message relay 350 may be described as a wireless gateway. Message relay 350 represents a portion of a first wireless data path between enterprise server 104-1 and mobile communication device 116. For instance, the wireless packet data service network 112 may be comprised of a GPRS as a means to abstract the one-to-many connection needs of remote services server 106 and desktop 122. This first wireless data path is the standard data path between enterprise network 102 and mobile communication device 116. In certain embodiments, this data path will generally be established whenever mobile communication device 116 is active.

In a similar manner to message relay 350, communication node 352 may represent any one of a number of network structures capable of operating as an interface between two networks. Communication node 352 may also be described as a wireless gateway. Communication node 352 represents a portion of a second wireless data path between server 104-1 and mobile communication device 116. In certain embodiments, this second data path will only be established as needed for transmission of large blocks of data between enterprise network 102 and mobile communication device 116. In some embodiments the communication node 352 may be a VPN concentrator within the enterprise, an intermediated connection prior to the service end point 104. In general, message relay 350 represents a low-cost, low-bandwidth communications path suitable for electronic messages and similar traffic, while communication node 352 represents a higher-bandwidth limited availability communications path suitable for attachments. This path may be on a different RAT. Those of skill in the art will appreciate that reference to first and second data paths is to be understood in the context of the communications system within which mobile communication device 116 is operating. In certain embodiments, the first and second data paths represent virtual private networks.

A number of modules within server 104-1 are specifically broken out in FIG. 4. These include electronic message server application 354, electronic message router 356 and attachment router 358. Each of these modules has a discrete function in the forwarding of attachments from enterprise network 102 to mobile communication device 116. Those of skill in the art will recognize, however, that the separation of the attachment forwarding functions into these discrete modules is intended only for purposes of illustration. A particular embodiment may separated the functions into more or fewer modules as appropriate for a given implementation.

Electronic message server application 354 receives incoming message traffic from internet 108 and routes such traffic accordingly. In general, an incoming message addressed to the user of desktop 120 is routed, along with any attachments, to desktop 120. Electronic message router 356 receives notifications of messages coming in to electronic message server application 354. Upon receipt of a message from electronic message server application 354, electronic message router 356 pushes any messages addressed to the user of mobile communication device 116 to mobile communication device 116 via a first data path through internet 108, message relay 350, wireless network 112 and base station 114. Where there is an attachment to such a message, the attachment is forwarded to attachment router 358 for communication to attachment handling module 216 of mobile communication device 116 via a second data path through internet 108, communication node 352, wireless network 112, and base station 114. The second path may be on a different overlayed RAT, or it may be established by negotiation of a higher QoS between mobile communication device 116 and the same wireless network providing the first data path.

As noted above, the second data path may be a temporary data path established only when, and for so long as, a supplemental data path is necessary for communication of an substantial block of data. The characteristics of the second data path will vary by implementation. If mobile communication device 116 is multihomed, it may create an additional higher QoS PDP context in order to acquire a public IP address, or it may be implemented via ad hoc Wi-Fi networks. In certain embodiments, the second data path is a virtual private network (VPN). Where the first data path is a secure encrypted data path, the second data path may employ the same encryption keys as the first data path. These and other variations are well within the knowledge of one of ordinary skill in the art.

Figure 5:
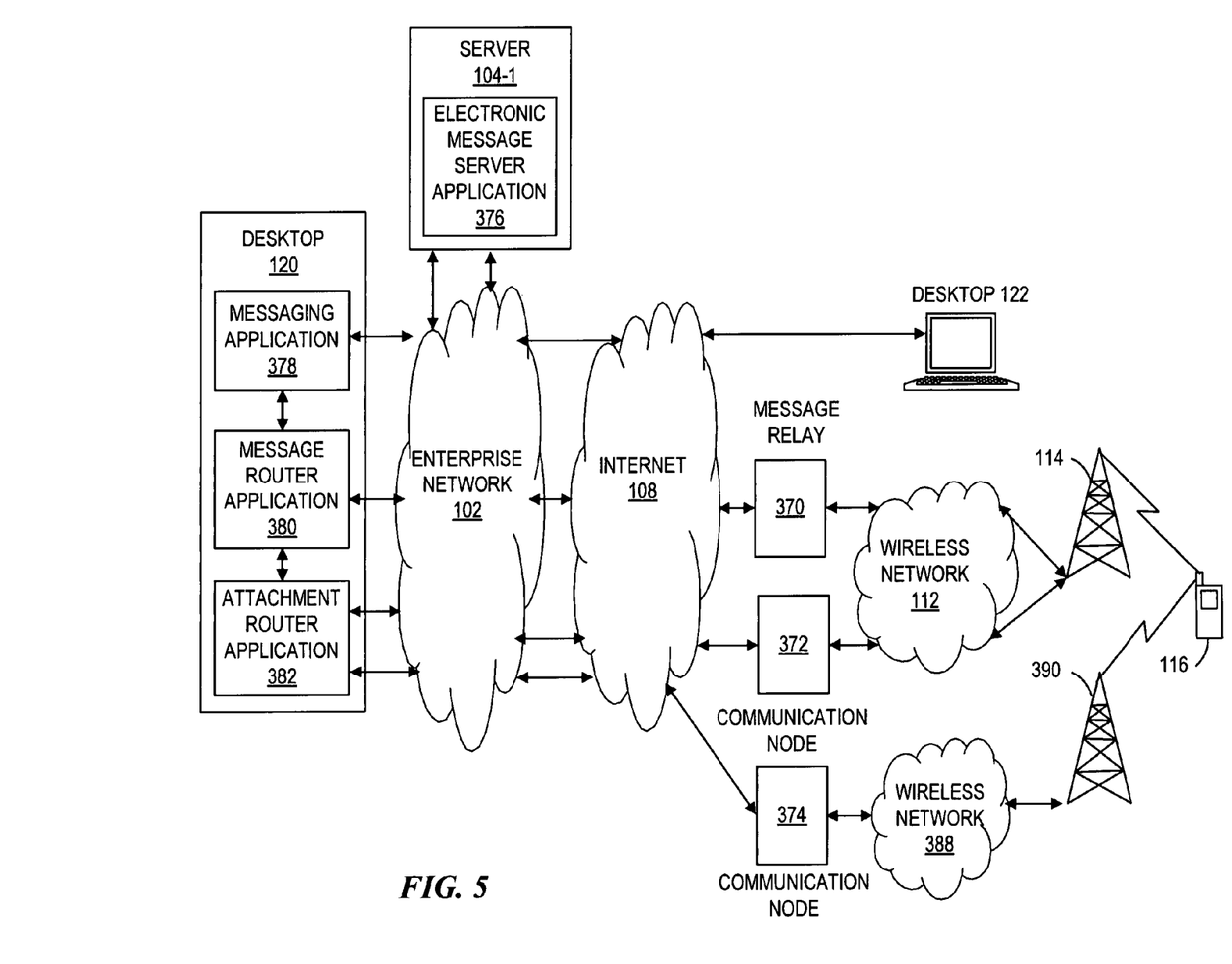
FIG. 5 depicts a detail view of the network environment of FIG. 1 showing the details of a desktop computer used for message forwarding.

FIG. 5 is a second embodiment of the network environment 100 shown in FIG. 1. In this embodiment, message and attachment handling is managed on desktop computer 120 rather than on server 104-1. Other than the location of the software, the operation of the system is substantially the same. In a similar manner to server 1041, described above in connection with FIG. 4, desktop 120 is connected to mobile communication device 116 via two data paths.

The first wireless data path includes enterprise network 102, internet 108, message relay 370, wireless network 112 and base station 114. This first data path is the standard data path. In certain embodiments, this data path is established whenever mobile communication device 116 is active. The second wireless data path includes enterprise network 102, internet 108, communication node 372, wireless network 112 and base station 114. In certain embodiments, this second data path is established only temporarily as needed. As above, the first data path passing through message relay 370 represents a low-cost, low-bandwidth communications path suitable for electronic messages and similar traffic, while the second data path passing through communication node 372 represents a higher-bandwidth, limited availability communications path suitable for movement of large blocks of data.

Electronic message server application 376 is shown operating on server 104-1. Electronic message server application 376 is an enterprise level application operable to handle electronic message routing between the users of enterprise network 102 and users of internet 108. In a similar manner to the depiction of application server 104-1 within FIG. 4, a number of modules within desktop computer 120 are specifically broken out in FIG. 5 for illustration. These include messaging application 378, message router application 380 and attachment router application 382. As noted above, the separation of the message and attachment routing functions into these modules is only for purposes of illustration, and is not necessarily meant to convey a particular arrangement of software modules.

Electronic message server application 376 receives incoming message traffic from internet 108 and routes such traffic accordingly within enterprise network 102. In general, an incoming message addressed to the user of desktop 120, along with any attachments, is routed to desktop 120. Where the user has a mobile communication device 116 associated with the same account, incoming messages to the user are also routed to mobile communication device 116. Message router application 380 receives notifications of messages coming in to messaging application 378.

Upon receipt of a message from messaging application 378 and identification of the appropriate mobile communication device associated with the recipient of that message, message router application 380 pushes the message to the appropriate mobile communication device 116 by way of enterprise network 102, internet 108, message relay 370, wireless network 112 and base station 114. Where there is an attachment to a message, the attachment is forwarded to attachment router application 382 for communication to the appropriate mobile communication device 116 via a supplemental data path through enterprise network 102, internet 108, communication node 372, wireless network 112 and base station 114. In certain embodiments, the supplemental data path may pass through a completely separate communication node and wireless network, as represented by the lowermost data path depicted in FIG. 5. This path passes through enterprise network 102 and internet 108 in the same manner as the other data paths. The other end of this supplemental data path connects to mobile communication device 116 through communication node 374, wireless network 388 and tower 390. This wireless network may communicate to the mobile communication device 116 using the same RAT as the primary data path, or may employ a completely different RAT from the primary data path.

Figure 6:
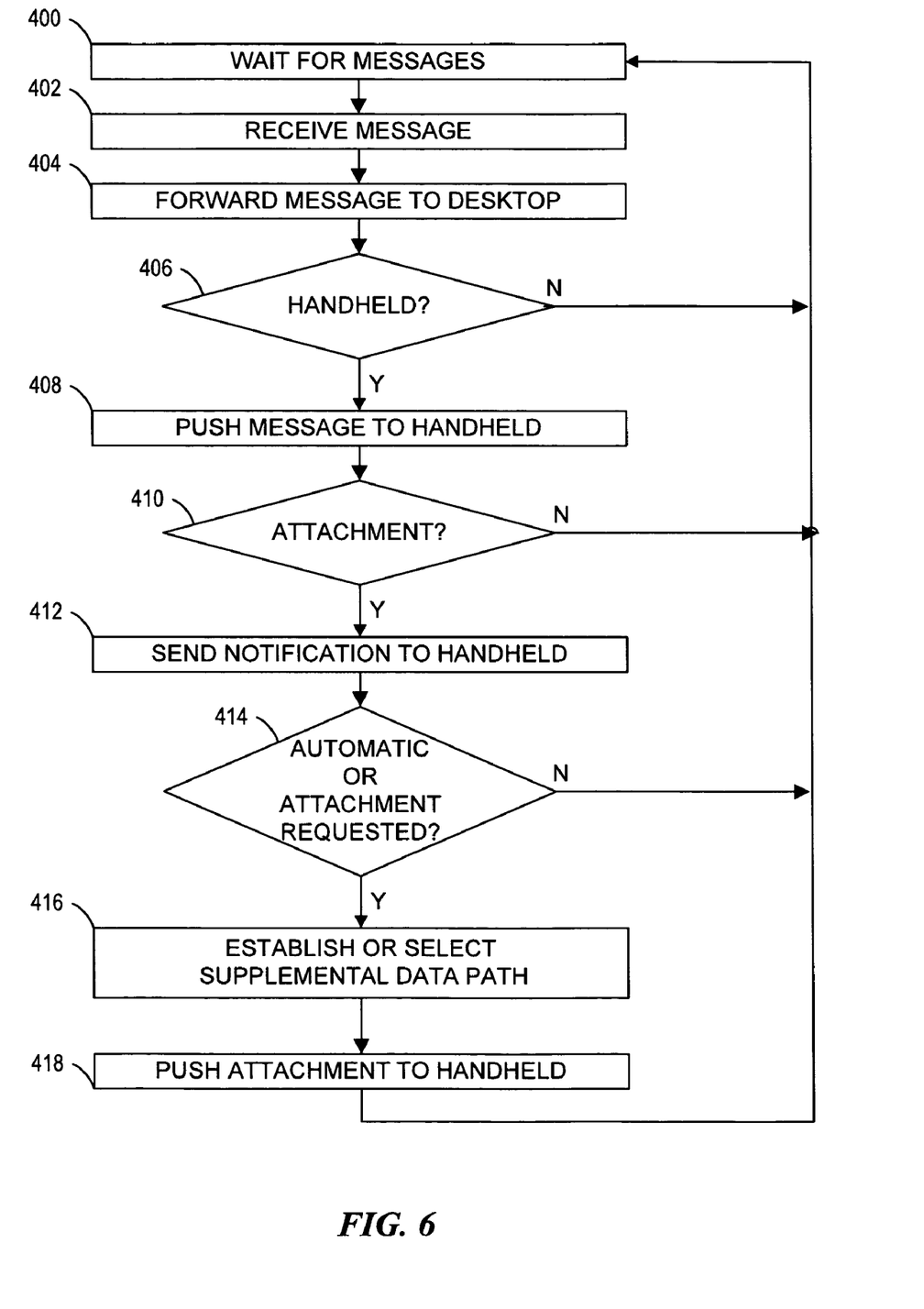
FIG. 6 depicts a flowchart of a process for communicating a message attachment to a mobile communication device.

The manner of operation of the embodiments shown in FIGS. 4 and 5 are depicted in flowchart form in FIG. 6. In block 400, the system waits for messages. In block 402, the system receives a message. In block 404, the system forwards the message to the desktop. In decision block 406, the system determines whether there is a mobile communication device associated with this electronic messaging account. If there is no mobile communication device associated with this account, message flow returns to block 400. If there is a mobile communication device associated with this account, process flow proceeds to block 408. In block 408, the message is pushed to the mobile communication device with a notification if there is an attachment.

Algorithm block 410 determines whether there is an attachment associated with the incoming message. If there is no attachment associated with the incoming message, process flow returns to block 412. If an attachment is present, the algorithm may behave differently depending on whether it is configured to automatically or manually retrieve the attachment on the supplemental data path. Certain embodiments of the present disclosure may employ an "automatic mode," wherein previous attachments not retrieved may be downloaded to the device automatically. This process may be triggered by the availability of a second data path. This may occur, for example, when a wireless device moves into an overlay RAT coverage area for which the device is configured to establish the second data path. If there is an attachment, process flow proceeds to block 414. In block 414, a notification is sent to the mobile communication device that there is an attachment associated with the message. Decision block 414 determines whether the attachment has been requested and whether the algorithm is operating in an automatic mode. If the algorithm is in a manual configuration and there is no request for the attachment, process flow returns to block 400. Otherwise, process flow proceeds to block 418, where the system either establishes a new supplemental data path or selects an existing supplemental data path.

In certain embodiments, the details of the supplemental data path are set up between the sender and the mobile communication device via the primary data path via a new QoS. This communication may include the public IP address of the mobile communication device. This may also include communication of the necessary encryption information for establishment of a secure data path. After the supplemental data path is established or selected, process flow proceeds to block 418, where the system pushes the attachment to the mobile communication device over the supplemental data path, after which process flow returns to block 400.

Figure 7:
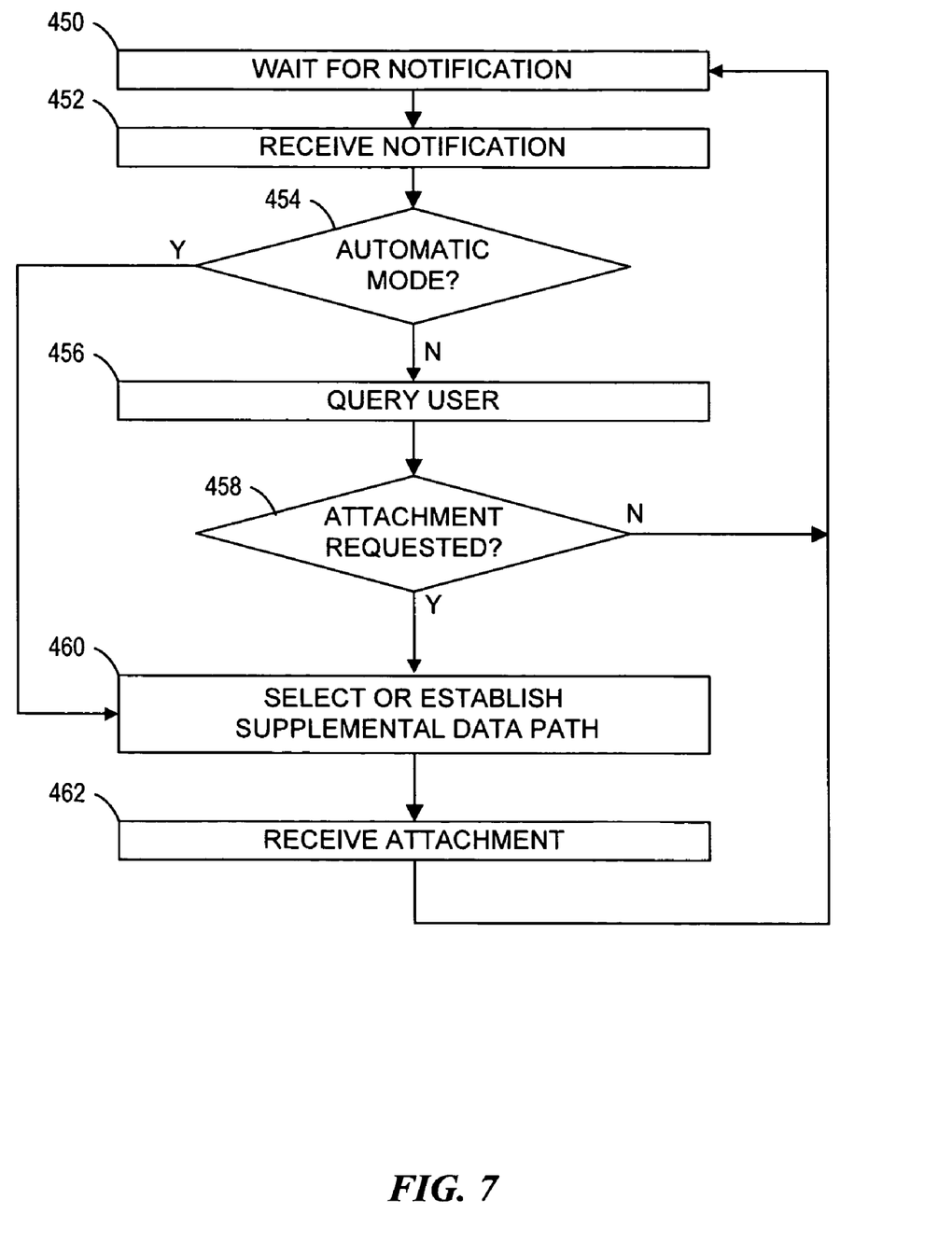
FIG. 7 depicts a flowchart of a process for receiving a message attachment at a mobile communication device.

A process for receiving a message attachment at a mobile communication device is depicted in flowchart form in FIG. 7. Process flow begins in block 450, wherein the mobile communication device waits for notification of a message attachment. In block 452, a notification is received. Process flow from decision block 454 depends on whether or not the mobile communication device is operating in an automatic download mode. If it is in an automatic mode, then process flow proceeds to directly to block 460. If it is not in an automatic mode, then process flow proceeds to block 456, where the user is queried as to whether the message attachment is to be downloaded. Process flow the proceeds to decision block 458.

Process flow from decision block 458 depends on whether the user desires for the message attachment to be downloaded. If the user does not request the message attachment, process flow returns to block 450. If the user does request the message attachment, process flow proceeds to block 460, where a supplemental data path is selected or established. Subsequently, the message attachment is received via the supplemental data path and process flow returns to block 450, where the device waits for additional notifications.

It is believed that the operation and construction of the embodiments of the present disclosure will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method of operating a mobile communication device, the method comprising:
   maintaining a first wireless data path to an application server via a first wireless packet data service network, the first wireless data path being a secure end-to-end continuous communication link;
   receiving an electronic message and an attachment notification via the first wireless data path; and
   in an automatic mode, establishing a second wireless data path for transmission of the attachment to the mobile communication device when the mobile communication device is within a coverage area for a given radio access technology with which the device is configured to establish the second wireless data path;

wherein the second wireless data path is a secondary PDP context of higher quality of service than the first wireless data path.

2. The method as recited in claim 1, wherein the second wireless data path is terminated upon completing transmission of the attachment.

3. The method as recited in claim 1, wherein the second wireless data path is a secure wireless data path.

4. The method as recited in claim 1, wherein the first data path passes through a message relay and the second data path circumvents the message relay.

5. The method as recited in claim 1, wherein the second wireless data path is a virtual private network.

6. The method as recited in claim 1, further comprising communicating with the application server via the first wireless data path in order to establish the second wireless data path.

7. The method as recited in claim 1, further comprising, when the given radio access technology is not found at the time the attachment notification is received, automatically establishing the second wireless data path for transmission of the attachment to the mobile communication device responsive to determining that the mobile communication device has moved into a coverage area for the given radio access technology.

8. The method as recited in claim 1, further comprising, in a manual mode, establishing the second wireless data pathway responsive to receiving a request from the user to retrieve the attachment.

9. A mobile communication device comprising:

a communications subsystem containing a transmitter and a receiver;

a module operable to maintain a first wireless data path to an application server via a first wireless packet data service network, the first wireless packet data service network being a secure, end-to-end continuous communications link;

a module operable to receive an electronic message and an attachment notification via the first wireless data path; and a module operable, in an automatic mode, to establish a second wireless data path for transmission of the attachment responsive to determining that to the mobile communication device the mobile communication device is within a coverage area for a given radio access technology with which the device is configured to establish the second wireless data path wherein the second wireless data path is a secondary PDP context of higher quality of service than the first wireless data path.

10. The mobile communication device as recited in claim 9, wherein the module operable in an automatic mode is operable to terminate the second wireless data path upon completing transmission of the attachment.

11. The mobile communication device as recited in claim 9, wherein the modules are operable to set up the second wireless data path as a secure wireless data path.

12. The mobile communication device as recited in claim 9, wherein the first data path passes through a message relay and the second data path circumvents the message relay.

13. The mobile communication device as recited in claim 9, wherein the second wireless data path is a virtual private network.

14. The mobile communication device as recited in claim 9, further comprising a module operable to communicate with the application server via the first wireless data path in order to establish the second wireless data path.

15. The mobile communication device as recited in claim 9, wherein when the module operable to establish the second wireless data path is unable to find the given radio access technology, establishing the second wireless data pathway for transmission of the attachment to the mobile communication device responsive to determining that the mobile communication device has moved into a coverage area for the given radio access technology.

16. The mobile communication device as recited in claim 9, wherein the module operable to establish the second wireless data is further operable, in a manual mode, to establish the second wireless data pathway responsive to receiving a request from the user to retrieve the attachment.

* * * * *